Figure 1:
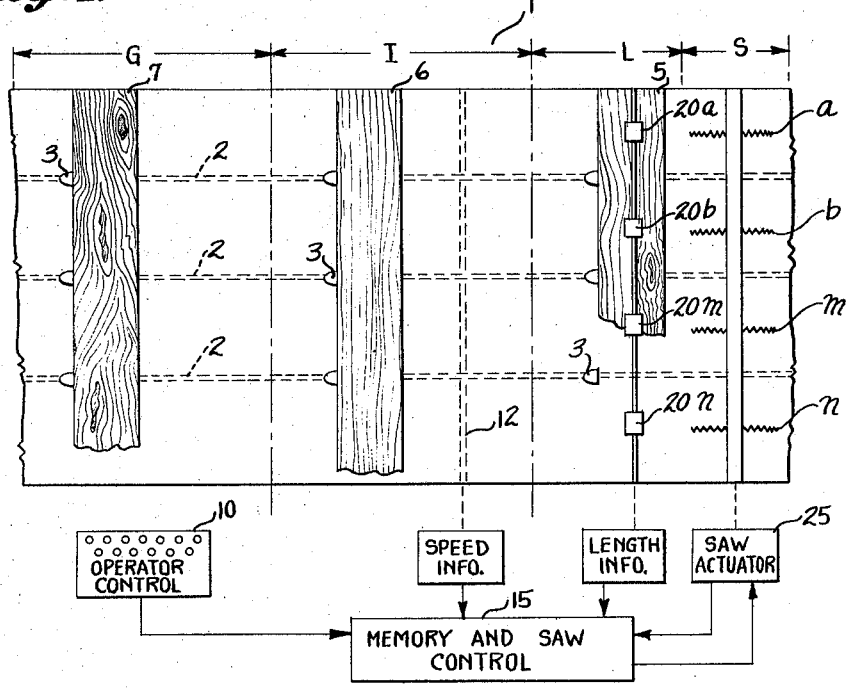

April 5, 1966  C. A. SHERMAN  3,244,204

MULTIPLE SAW ELECTRONIC CONTROL APPARATUS

Filed May 8, 1964  3 Sheets-Sheet 1

WRITE   READ   LENGTH   CLEAR

INVENTOR.
CHARLES A. SHERMAN
BY
ATTORNEYS

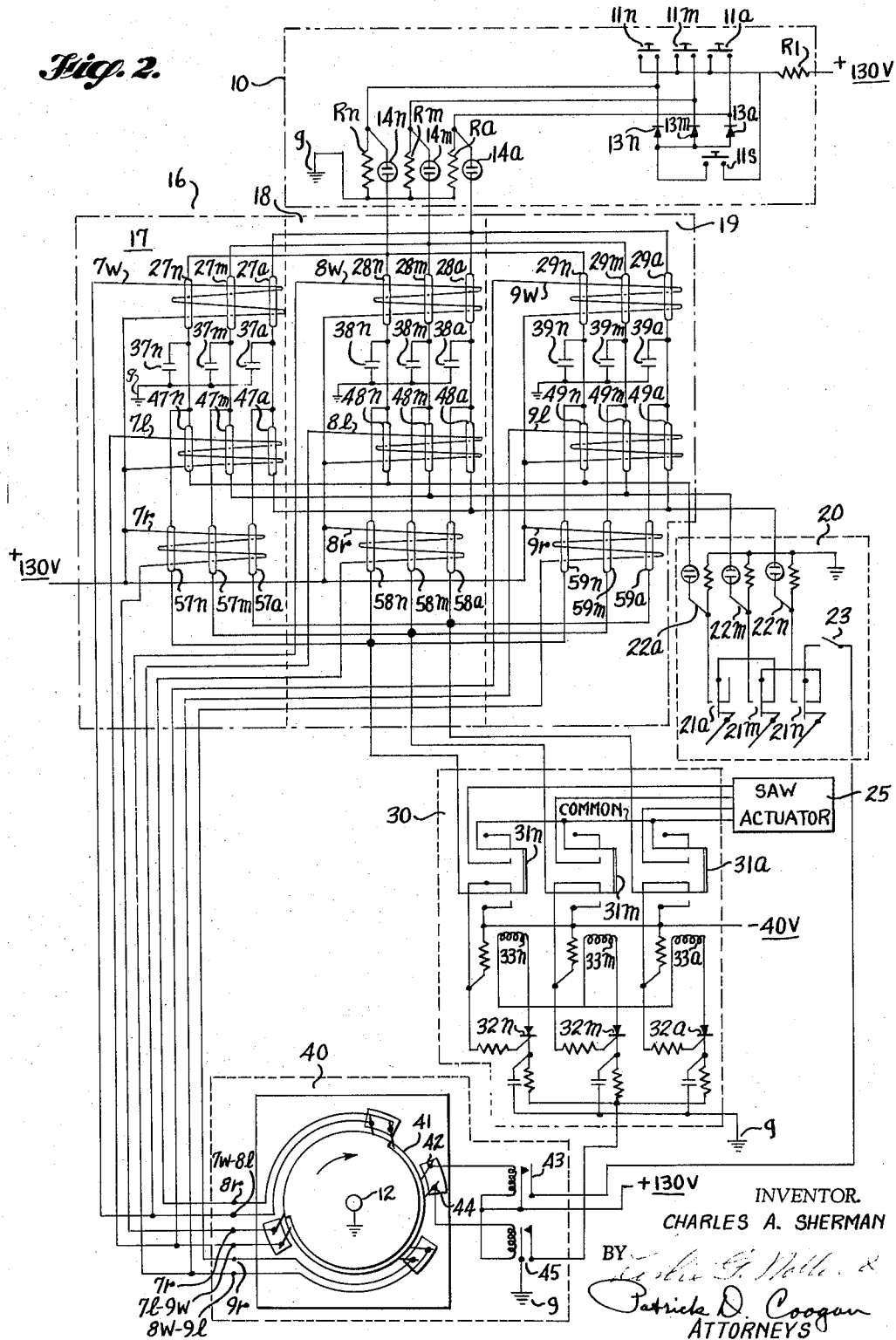

April 5, 1966  C. A. SHERMAN  3,244,204
MULTIPLE SAW ELECTRONIC CONTROL APPARATUS
Filed May 8, 1964  3 Sheets-Sheet 3

INVENTOR.
CHARLES A. SHERMAN
BY
Patrick D. Coogan
ATTORNEYS

United States Patent Office 3,244,204
Patented Apr. 5, 1966

3,244,204
MULTIPLE SAW ELECTRONIC CONTROL
APPARATUS
Charles A. Sherman, Tacoma, Wash., assignor to Weyerhaeuser Company, Tacoma, Wash., a corporation of Washington
Filed May 8, 1964, Ser. No. 366,002
15 Claims. (Cl. 143—168)

This invention relates to an electronic control system and in particular to an electronic control system which is used in a lumber mill to control a plurality of individually operable lumber trim saws and which includes a memory facility and a board end trim capability.

In the production of lumber products, it is desirable to separate select portions of a board from defective or lower grade portions. After the lumber is rough cut into large boards, it is then conveyed to a grading station where a skilled grader visually inspects the lumber and determines which of a plurality of trim saws will be ultimately actuated to cut away from select portions of lumber inferior grade and defective portions. The board is then conveyed through an intermediate station and finally to a trimming station where a plurality of saws which are individually operable are lowered selectively in response to the grader's determination to cut away the defective and lower grade portions of the lumber yielding the maximum lengths of high grade portions of lumber.

Due to mechanical failures and interruptions in supply, sorting, and grading, the conveyor from the grading station to the trimming station often times is slowed down or stopped for indeterminate periods of time. It is, therefore, a requirement of any saw determination and control apparatus that it be able to hold the grader's saw determination signals for a sufficient period of time for them to be available for saw actuation when the board which has been graded is in trimming position beneath the saws. For simplicity there is also a requirement for such a saw control system that it be operable by a single grader and that it requires no further manual inputs once the grader has made his determination of saws to be used on any particular board.

In order that the grader's responsibilities are lessened to the extent to permit the conveyor to operate at a higher speed, it is desirable that the end trimming saw be selected automatically and not require manual determination by the grader. To accomplish this, it is necessary that the saw control system incorporate a facility for automatically sensing increments of standard lengths of board so that the board may be end trimmed automatically by the saw which will yield the maximum standard length of board. Since lumber is often bowed or warped the standard length sensing means must not affect the saw control until the board has actuated all of the sensing units its length warrants. If the sensing means were to affect the saw control upon the first contact with the leading edge of the lumber, the warped sections might actuate one sensing element earlier than another sensing element and cause actuation of a lesser standard length saw to trim the board shorter than its length warrants.

It should be noted that although this control means is disclosed for use in controlling a lumber trimming operation it also has utility in controlling a sorting process where the workpiece is graded and the grade signal is held in a memory until that workpiece reaches a sorting point where a plurality of conveyor gates or similar means are actuated to permit a path in accordance with the grade given.

It is, therefore, an object of this invention to provide a control means for selectively activating a plurality of elements at one point in time in accordance with a selection made sometime earlier.

It is a further object of this invention to provide a reliable, effective multiple saw control apparatus which incorporates a facility for maintaining saw determination signals for a period of time sufficient for a graded board to pass from the grading station to the trimming station where the selected saws are actuated notwithstanding interruptions in the conveying of the board between these stations.

It is further object of this invention to provide a multiple saw control apparatus which incorporates a facility for automatically sensing maximum standard lengths of each board even though the board is bowed or warped and which actuates the saw which will automatically trim the end of the board to yield the maximum standard length of lumber.

It is a further object of this invention to provide an electronic multiple saw control apparatus which utilizes capacitors to store saw determination signals by becoming charged in response to the actuation of the grader's switches and which hold the charge a period of time required for the board to pass from the grader station to the saw actuation station at which time the capacitors are discharged to actuate electronic controls for individually actuating the selected saws for trimming the board.

It is a further object of this invention to provide a memory control system which incorporates banks of capacitors which are selectively charged and discharged through the action of a sequence mechanism which operates at a speed in relation to the movement of the boards being conveyed from the saw determination station to the saw actuation station.

It is a still further object of this invention to provide a multiple saw control apparatus which utilizes memory wheels which include capacitor elements which become charged in response to grader control signals and which capacitors are rotated at a speed in relation to the movement of the boards which have been graded to a read-out element which permits discharge of the capacitors through electronic controls for actuation of the individual saws selected by the greater to cut the particular board in the saw actuation station.

In the practice of this invention, boards which are to be upgraded by trimming are conveyed in a direction that is transverse to the boards' lengths. The boards are viewed by a grader at the saw determination station who, through the actuation of individual saw control switches, causes memory capacitors to become charged. The boards continue through intermediate stations to a standard length sensing station where the maximum standard length of each board is automatically sensed and this length signal is introduced into the saw control apparatus. As the boards reach the sawing station, the memory capacitors are discharged through controllers which actuate the particular saws which have been determined by the grader and the board is cut accordingly.

Figure 3:
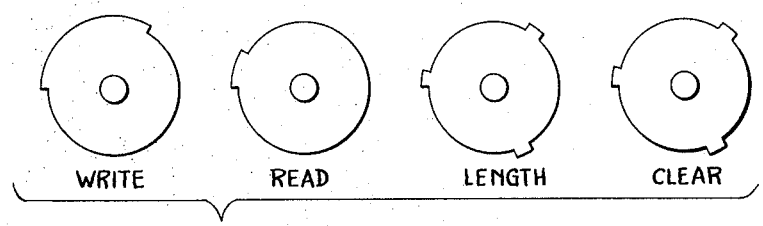
Figure 4:
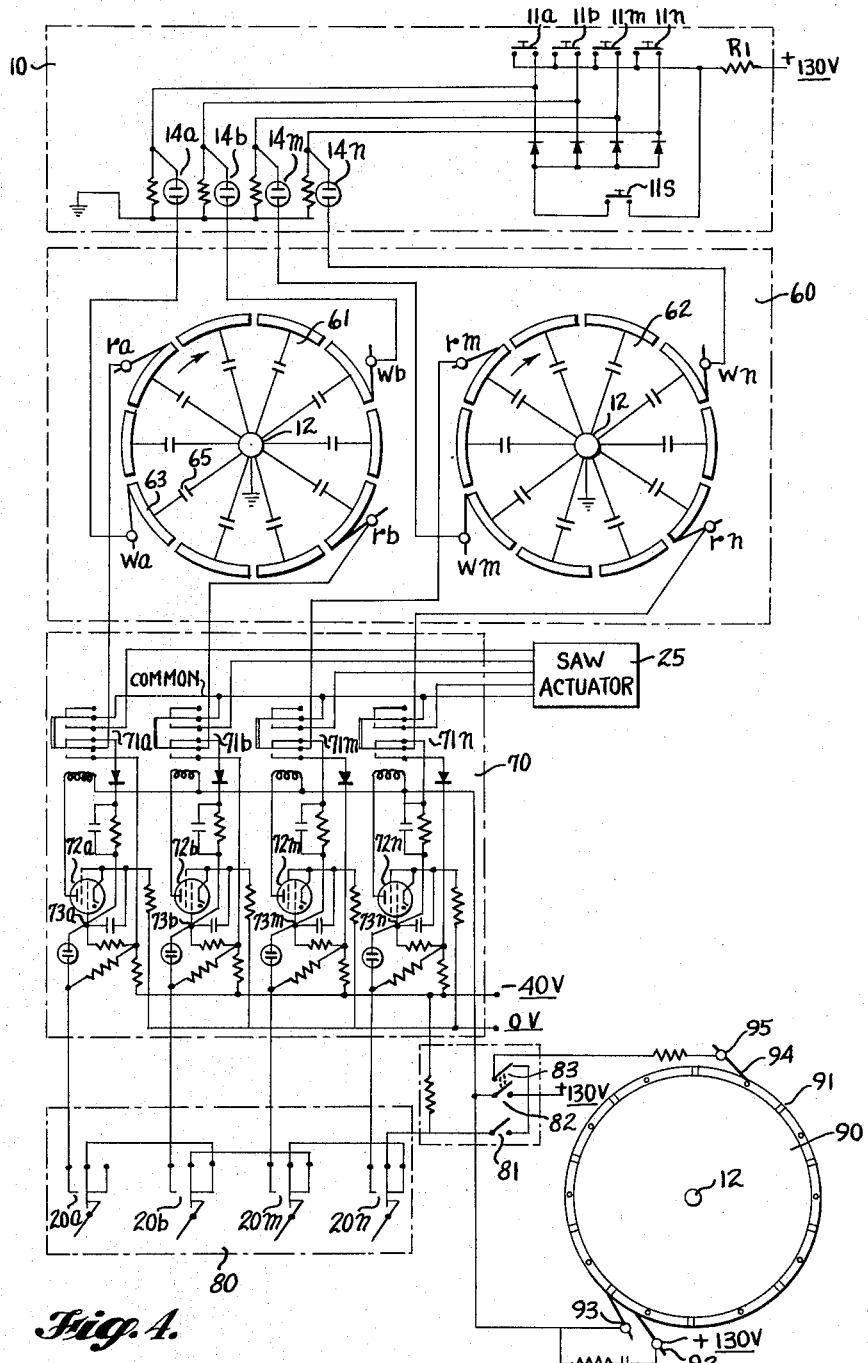

These and other objects and advantages are attained by the present invention. Various changes may be made, however, in the construction and arrangement of parts in the apparatus and certain features may be used without the use of other features. All such modifications are intended to be within the scope of the appended claims. The present invention is described herein below in conjunction with the accompanying drawings wherein:

FIGURE 1 is a plan view of a lumber grading and trimming line showing in schematic form the control apparatus for controlling a plurality of saws, FIGURE 2 is a circuit diagram showing one form of the multiple saw control apparatus, FIGURE 3 is a layout of the sequence cams which are used in the control apparatus shown in FIGURE 2, FIGURE 4 is a circuit diagram showing a modified form of the mutiple saw control apparatus.

A typical layout of a saw grading and trimming line 1 is shown in FIGURE 1 which may include a chain conveyor 2 having lugs 3 or any other suitable means for conveying individual boards 5, 6, and 7, from one station to another. The boards are first conveyed in a direction transverse to their length to a grading station G where they are viewed by an operator or grader who determines which saws should be actuated in trimming the particular board before him to yield the most valuable product. He enters this selection into the operator control 10 and this selection is transmitted to the memory and saw control apparatus 15. As the boards are conveyed through any number of intermediate stations I, the speed of movement of the boards is transmitted through shaft 12 to the memory and saw control apparatus 15. The boards continue through length sensing station L where the standard length sensing switches 20a, 20b, 20m and 20n are positioned at standard lengths from one end of the board and are actuated by the board passing beneath them to indicate the maximum standard length of the board and to transmit this information to the control apparatus 15. Finally the boards pass through a sawing station S where the boards are trimmed by the lowering of selected saws a, b, m and n in response to the control signal from the saw control 15 through the saw actuator 25. As shown there are four saws and four standard length sensing means. However, this number could be easily increased or reduced and is only shown for purposes of explanation in the present number.

FIGURE 2 shows a circuit diagram of the first embodiment of the multiple saw control apparatus which includes operator control 10, memory unit 16 having three memory banks 17, 18 and 19, the length information unit 20, saw actuator 25, saw controller 30, and the sequence unit 40. This embodiment is shown with sufficient elements to control three saws, a, m and n. Of course, any number of saws could be controlled by simply increasing the elements which are to be discussed.

Looking now to the operator control 10 as shown in FIGURE 2, the operator control panel includes saw actuation buttons 11a, 11m, and 11n, and a slash button 11s. Any one, multiple, or all of the buttons 11a, 11m and 11n may be depressed in order to select the particular saws which are to be actuated when the board being graded has reached the sawing station S. The slash button 11s permits all of the saws to be subsequently actuated at one time. In series with these buttons, are found diodes 13a, 13m, and 13n, and neon lamps 14a, 14m and 14n. In series with the +130 volt D.C. power lead to the control buttons 11 is a small resistor R1 which limits the initial current surge that will in time tend to ruin the neon lamps 14 and will also adversely affect the memory unit 16. The resistors Ra, Rm and Rn placed just ahead of the neon lamps 14 serve the purpose of neutralizing any stray currents which may build up in the wiring and might otherwise place a false charge on the memory unit 16. The neon bulbs 14 act as a very high resistance until their critical voltage is reached whenever one of the buttons 11 is depressed. This high resistance feature is desirable to prevent the charge which is being placed upon the memory capacitors from leaking away.

The memory unit 16 shown in FIGURE 2 consists of the three identical memory banks 17, 18 and 19. The first memory bank 17 will be explained in detail with it understood that the other two memory banks 18 and 19 have the same elements and construction features. The leads from the operator control unit 10 are connected first to switch means 27 which are denoted as write switches. Continuing from the write switches 27, connection is made with the upper side of memory capacitor 37a, 37m and 37n, which are connected at their lower side to a common ground g. A second set of switches, the length switches 47a, 47m and 47n, also are connected to the upper side of the capacitors 37a, 37m and 37n. The other ends of the length switches 47 are connected to the length information unit 20. The third set of switches, the read switches 57a, 57m and 57n, are also connected to the upper side of the memory capacitors 37a, 37m and 37n. The other ends of the read switches are connected to the saw control unit 30. The switches 27, 47 and 57 are all normally open glass enclosed reed switches and are surrounded by coils which when energized cause the reeds to meet and thereby close the switches. For example, the coil 7w surrounds the write switches 27 in such a manner that when the coil 7w is energized all of the write switches in the first memory bank 17 will become closed and will thus enable any current from the control unit 10 to pass through the write switches 27 to the memory capacitors 37. Likewise the coil 7l surrounds the length switches 47 in such a way that when the coil 7l is energized all of the length switches 47 will become closed and permit passage of current from the length information unit 20 to the capacitors 37. In a like manner, when the coil 7r is energized the read switches 57 become closed and to permit the discharge of the capacitors 37 to be conducted from the memory bank 17 to the saw control unit 30.

Referring now to the length information unit 20 shown in FIGURE 2, it is seen that there are three standard length sensing elements 21a, 21m and 21n, which are connected in series cascade so that current will be allowed to follow the path from the largest standard length indicating sensing switch actuated to the memory unit 16. In series with the sensing elements 21 are neon lamps 22a, 22m and 22n which are connected and operate in a manner similar to the lamps 14a, 14m and 14n in the operator control unit 10. An automatic end sensing switch 23 may be provided so that the automatic standard length sensing feature may be made inoperative by opening switch 23.

The saw control unit 30 shown in FIGURE 2, is connected to the output side of the memory unit 16 so that as the memory unit capacitors 37, 38 and 39 are connected to the control unit 30 by means of the energization of the read coils 7r, 8r or 9r the capacitors will discharge to the control unit 30. The current from the discharging capacitors passes through the control unit 30 to relays 31a, 31m or 31n completing the circuit to the gates of controlled rectifiers 32a, 32m or 32n causing the rectifiers to become conductive, energizing the corresponding coils 33a, 33m or 33n, changing the relays 31 to a second position which permits a minus 40 volt current to pass back through the capacitors 37, 38 or 39 to neutralize the capacitor's charge. Once the relays 31 are in the second position a connection is made from the common saw actuator lead to the particular saw a, m or n, lead to actuate the particular saw which corresponds to the capacitor which has just discharged.

The selection of the capacitors in the memory unit 16 to become charged in response to the actuation of the operator control switches 11 and the other operations which are dependent upon the energization of the reed switches in the memory banks 17, 18 and 19 are dependent upon the sequence unit 40 shown in FIGURE 2. Basically the sequence unit 40 consists of four adjustable program cams which are shown in greater detail in FIGURE 3 and are mounted on a shaft 12, so that they will move in direct relationship with the movement of the board conveying chains 2 shown in FIGURE 1. The cams are connected to a common ground through shaft 12 and provide electrical continuity between the ground and the various coils in the memory unit 16. Around the circumference of the sequence wheel 41 are positioned small wire brushes or other suitable connectors for providing contact between the cams and the leads of the memory unit coils and other leads which will be mentioned later. For example, the uppermost connector unit has a connection to the 8r coil and a combination connector to the 7w and 8l coils.

Referring to FIGURES 2 and 3, the first cam denoted the "write" cam permits electrical continuity to energize in the proper sequence the coils $7w$, $8w$ and $9w$ so that the signal placed in the operator control 10 by depressing the buttons 11 is transmitted from the operator control 10 to the particular memory bank 17, 18 or 19 and impressed upon the particular capacitors 37, 38 or 39 so that the particular board graded will be trimmed in accordance with the selection when the sequence wheel 41 has rotated to a position which corresponds to the position of the particular board in the sawing station S. The "read" cam permits electrical continuity through the read coils $7r$, $8r$ or $9r$ to permit a path from the charged capacitors through the read switches 57, 58, or 59 to the control unit 30 to discharge the capacitors and thereby actuate the saws selected. The "length" cam through contact with the brush 42 provides electrical continuity through the length write switch 43 to the length sensing elements 21 in the length information unit 20 which in turn permits the capacitors 37, 38 or 39 to become charged, when the length coils 71, 81 or 91 are energized. The "clear" cam through contact brush 44 and clear switch 45 will release the holding current on the saw controller 30 by making the controlled rectifiers $32a$, $32m$ and $32n$ non-conducting which will return the saw relays $31a$, $31m$ or $31n$ to the first or normal position. All of the cams in the sequence wheel 41 are cut at 120° spacing to correspond with the three memory bank structure of the memory unit 16. It is, of course, obvious that if there were more lug spaces between the grading station and the sawing station, the cams could be cut to a smaller degree of spacing permitting additional memory banks to be actuated.

In operation of the embodiment of the multiple saw control apparatus shown in FIGURE 2, the sequence wheel 41 is rotated on a shaft 12 at the speed and in direct relation to the movement of the boards conveyed from the grading station G to the sawing station S. For purposes of example, board 7 can be assumed to be first in the grading station G and the operator has not depressed the automatic length sensing switch 23 so this facility is not available to him. The operator viewing the board and seeing that it has several defects from end to end would depress the slash button $11s$ which would permit the connection between the 130 volt D.C. power source through all of the neon lamps $14a$, $14m$ and $14n$ to the memory unit 16. As shown in FIGURE 2 the write cam would provide electrical continuity between the ground and the contact $7w$, so that the coil $7w$ in the first memory bank 17 would be energized thereby closing the write switches $27a$, $27m$ and $27n$, permitting the current to pass from the control unit 10 to charge the capacitors $37a$, $37m$ and $37n$. As the shaft 12 continues to rotate and as the board 7 moves through the intermediate station I, the write cam now provides electrical continuity through the write coil $8w$ so that the next board in line in the following lug space would have its selection passed to the center memory bank 18. Since the length switches 21 are not energized, no change will occur when the board passes under the length sensing means $20a$, $20m$ and $20n$, and the board will pass to the sawing station S, at which time the read cam will be in position to energize the coil $7r$ which will close the read switches $57a$, $57m$ and $57n$ allowing a path for the charged capacitors $37a$, $37m$ and $37n$ to discharge through the control unit 30. In this case since all three capacitors are charged they will discharge through all three relays $31a$, $31m$ and $31n$, impressing the discharging current upon the gates of the controlled rectifiers $32a$, $32m$ and $32n$ causing them to be conductive and permitting the coils $33a$, $33m$, and $33n$ to be energized which actuates the relays $31a$, $31m$ and $31n$ to the second position permitting the negative voltage of minus 40 volts to return to the capacitors $37a$, $37m$ and $37n$ to neutralize these capacitors and at the same time the circuit is completed from the common connection in the control unit 30 to all of the saw actuator units permitting all of the saws $a$, $m$ and $n$ to be actuated to cut the board 7 into scrap pieces. The clear cam continues to rotate past the contact 44 energizing the clear switch 45 breaking the conductivity of the controlled rectifiers $32a$, $32m$ and $32n$ de-energizing the coils $33a$, $33m$ and $33n$ which release the relays $31a$, $31m$ and $31n$ to their normal first position, breaking the common connection to the saws in the saw actuator 25 to restore the saws to the normal unactuated condition. This cycle can be repeated over and over with random selections of saws. If there is an interruption in the conveying of the boards from the grading station G to the sawing station S, the sequence cams will not be rotated during this interruption and the charged capacitors will retain their charge for approximately one hour so that when the holdup has been eliminated and the conveying returns to normal condition, the preselected saws will be actuated when the boards reach the sawing station S without further inputs from the grader.

Had the operator depressed the automatic end trimming switch 23 the board 7 when it reached the length sensing station L would have actuated all of the length sensing switches $21a$, $21m$ and $21n$, and the connection would have been made through the memory bank 17 through the length switch $47n$ to the capacitor $37n$ and the end saw would have been actuated to trim the board at this point.

Now referring to FIGURE 4, it is seen that a second embodiment of the multiple saw control apparatus is shown. In this modification the operation control unit 10 is identical to that shown in FIGURE 2 except that there is one more button, $11b$. The major differences between the embodiments are in the memory apparatus and the sequence mechanism. In this modification the memory apparatus 60 consists of a number of capacitor memory wheels 61, 62 which are mounted on the shaft 12 and rotate in direct relationship with the conveyance of the boards from the grading station G to the sawing station S.

As shown, the capacitor memory wheels 61 and 62 permit the wheels to make one full revolution for every ten lugs which pass any given point. For example, if the capacitor contact element 63 on the memory wheel 61 receives a charge through the $wa$ contact which in turn will charge the capacitor 65. The wheel will rotate in the direction of the arrow to the $ra$ contact when the board has moved from the grading station G to the sawing station S. Thus a, selection is written into the memory by the $wa$ contact for actuation of the $a$ saw and this charges the capacitor 65 which will be read out by discharging capacitor 65 when the contact element 63 reaches the read out contact $ra$. In a like manner the selection of the $b$ saw will be written into the memory wheel 61 by the $wb$ contact and read out by the $rb$ contact.

The third major component of the embodiment shown in FIGURE 4 is the control unit 70 which includes relays $71a$, $71b$, $71m$ and $71n$, which have two positions; the normal position as shown and an actuated position to be later described. When the capacitor in the memory unit 60 is discharged, it discharges through the contacts of relays 71 to the control grid of the thyratrons 72 permitting the thyratrons to become conductive energizing the coils of the relays 71 which changes the position of the relays to the second position which connects the common saw actuator lead to the particular saw lead which has been indicated by the discharging capacitor and that saw will be actuated into the sawing position to cut the board beneath it.

The fourth major component shown in FIGURE 4 is that of the standard length sensing unit 80 having the sensing switches $20a$, $20b$, $20m$ and $20n$, which are connected in series cascade so that the largest standard length switch which has been actuated will transmit a current to the control unit 70 to the thyratron gate connections 73 to energize the thyratron to actuate the relay 71 which corresponds to that standard length to actuate the saw to cut that standard length. When it is desired for the automatic end trim facility to be actuated the automatic end trim switch 81 is closed by the operator. This switch, of course, can be located on the operator control unit 10. If it is desired that the saws once selected stay selected regardless of the number of boards which pass the grading station G, the switch 82 can be closed, otherwise the switch 83 is closed permitting the normal operation of the saw selection control.

Referring now to the last disc 90 which is also mounted on the shaft 12 shown in FIGURE 4, this disc is constructed with a metal ring face which has 10 slots milled through the ring. These slots such as 91, are milled in such a way that when the two brushes 92, 93 are impressed upon the face of the metal ring brush 92 makes permanent contact while brush 93 breaks contact by means of the slots 91, ten times for each revolution of the disc 90. These contacting brushes determine the duration of the sawing cycle. The saw is held down in the sawing position as long as both brushes 92, 93 contact the ring face. Brush 92 is connected to a +130 volt D.C. source. Electrical continuity is provided to brush 93 through contact with the disc ring and current flows to one side of the coils of the relays 71a, 71b, 71m and 71n in the control unit 70 until brush 92 hits slot 91. Also located at the base of the metal ring are equally spaced pins, such as 94, which make contact with the brush 95, ten times each revolution of the disc 90. The function of the brush 95 is to determine when the incoming board is being sensed by the automatic standard length sensing means 20 and to allow these switches to be fully actuated by the board before the signal or surge of current is transmitted to the thyratron gate contacts 73. This center sensing of the board permits the actuation of the standard length sensing switches 20 without impressing a surge of current upon the thyratron which in turn would actuate the saw control if the board is warped and actually is longer than what would be first sensed by one of the shorter standard length switches. By the time the contact is made between the brush 95 and the pin 94 on the wheel 90, providing electrical continuity from the +130 volt D.C. source to length sensing unit 80, the board should be in a position under all of the standard length sensing switches 20 so that a true maximum standard length can be transmitted to the control element 70. With the contact of the brush 93 broken by the slots 91 in the wheel 90 the coils of the relays 71 are de-energized for a period sufficient to de-ionize the thyratron tubes 72 which will restore the relays 71 to the normal condition. One other feature of the control unit 70 is that the bias voltage of minus 40 volts is impressed back onto the capacitors which have just been discharged through the relay 71 contacts to neutralize the charge on these capacitors so that false charges will not be received by the controller when that particular capacitor element is again in register with a read out brush.

The operation of the embodiment shown in FIGURE 4 is similar to that of an embodiment shown in FIGURE 2 in all respects as to the operator action. The operator merely depresses the buttons 11 when the board is in the grading station G which permits contact between the 130 volt source to the write-in brush of the memory unit which corresponds to that saw selected. This allows current to charge the capacitor in the memory unit. The capacitor rotates in relation to the speed of the board being conveyed from the grading station G through the sawing station S until the capacitor makes contact with a read-out brush permitting the discharge of the capacitor through the saw relay contacts which ionizes a thyratron tube energizing a relay coil which permits contact between the saw actuator common lead with the particular saw selected. As the board reaches the length station L, the standard length sensing switches are actuated and as the board reaches the center of the length station L the sequence disc 90 makes contact through the pin 94 and the brush 95 allowing the connection between the 130 volt D.C. source through the maximum standard length switch which has been actuated to the thyratron tube which corresponds with this maximum standard length saw to actuate that saw to trim away the end of the board to yield the maximum standard length board possible. The sequence disc 90 continues to rotate until the brush 93 loses contact with the ring of the sequence disc which interrupts the current flow to the coil of the saw relays 71 de-energizing the thyratron tubes 72 restoring the saws to their normal condition.

Having now described my invention and in what manner the same may be used, what I claim is new and desire to protect by Letters Patent is:

1. A control apparatus for selectively activating a plurality of elements at one point in time in accordance with a selection made at an earlier period in time comprising in combination:

selection determination means which receive element selection signals;

memory means including capacitor means which can be selectively charged and discharged;

element control means which activates said elements in response to being energized;

sequence means which at said earlier period in time provides a connection between said determination means and said memory means to charge said capacitor means in accordance with a plurality of said selection signals made during said earlier period in time and at said one point in time provides a connection between said capacitor means and said element control means to discharge said capacitor means to energize said element control means to activate said elements selected.

2. A multiple saw control apparatus comprising in combination:

saw determination means for receiving operator saw selection signals;

lumber conveying means for conveying lumber from a saw determination station to a sawing station;

memory means including capacitor means which can be selectively charged and discharged;

saw controller means responsive to energization for activating saw means;

sequence means responsive to said lumber's movement on said conveying means from said saw determination station to said sawing station, for providing electrical continuity between said saw determination means and said memory means to charge said capacitor means in accordance with said selection signals and for providing electrical continuity between previously charged capacitor means in said memory means and said saw controller means to discharge said capacitors energizing said saw controllers to activate said saws in accordance with previously made selection signals.

3. The control apparatus of claim 2 wherein: said memory means receives one set of selection signals while one board is in said saw determination station and discharges said one set of selection signals when said one board reaches said sawing station.

4. The saw control apparatus of claim 2 including: maximum standard length sensing means operatively connected with said saw controller means and responsive to actuation by said lumber to impress an energizing current upon said controller means for actuating the saw which corresponds to the maximum standard length sensed by said sensing means.

5. The saw control apparatus of claim 4 wherein: said sequence means includes a length sensing delay means for delaying the maximum length sensed signal a period of time sufficient to insure actuation of all of said length sensing means possible by the lumber being sensed and thereby preventing actuation of a saw by said length sensing means in response to actuation of a shorter standard length sensing means by a bowed section of said lumber.

6. The saw control apparatus of claim 2 including: maximum length sensing means operatively connected with said capacitor means and responsive to actuation by said lumber to impress a charge upon said capacitor means to correspond with the saw which when actuated will trim the lumber to its maximum standard length.

7. The saw control apparatus of claim 6 wherein: said sequence means includes a length sensing delay means for delaying the maximum length sensed signal a period of time sufficient to insure actuation of all of said length sensing means possible by the lumber being sensed and thereby preventing actuation of a saw by said length sensing means in response to actuation of a shorter standard length sensing means by a bowed section of said lumber.

8. A multiple saw control apparatus comprising in combination:
   saw determination means for receiving operator saw selection signals;
   lumber conveying means for conveying lumber from a saw determination station to a sawing station;
   memory means including capacitor means which can be selectively charged and discharged;
   said capacitor means being mounted on wheel means which are mounted on a shaft means operatively connected to said conveying means;
   said wheel means including rim contact members which are individually connected to one side of each of said capacitor means and a grounded hub member which is connected to the other side of each of said capacitor means;
   saw controller means responsive to energization for activating saw means;
   memory write-in means positioned around the periphery of said wheel means in contact with said rim members;
   memory read-out means positioned about the periphery of said disk means in contact with said rim members and said controller means and displaced from the adjacent said memory write-in means a distance equal to the distance traversed by said rim members when said conveyor means traverses from said determination station to said sawing station whereby said selection signal passes from said determination means through said memory write-in means to charge said capacitor means when a board is in said determination station and said disk means rotates with said shaft means bringing said charged capacitor means into contact with said memory read-out means to discharge said capacitor means through said memory read-out means to energize said saw controller means to actuate the saws selected when said one board has reached said sawing station.

9. The multiple saw control apparatus of claim 8 including:
   sawing cycle duration disk means mounted on said shaft means having a conducting ring face;
   said ring face providing a constant contact face portion and an interrupted contact face portion;
   said interrupted contact face portion defining interruption slots equal in number to the number of said rim members;
   first brush contact means positioned to maintain constant contact with said constant contact face and connected with a power source;
   second contact brush means positioned to make contact with said interrupted contact face and providing a path from said first contact brush means through said ring face to said second contact brush means until said second contact brush means loses contact with said ring face at said interruption slots;
   said saw controlled means including a relay means connected with said second contact brush means and dependent upon the maintenance of electrical continuity from said power source for energization of said controller means.

10. The saw control apparatus of claim 9 including:
    maximum standard length sensing means operatively connected with said saw controller means and responsive to actuation by said lumber to impress an energizing current upon said controller means for actuating the saw which corresponds to the maximum standard length sensed by said sensing means;
    said duration disk including contact elements on said ring face in the path of third contact brush means, said third brush means connected with said length sensing means and providing, when in contact with said contact elements, said energizing current to said length sensing means.

11. A multiple saw control apparatus comprising in combination:
    saw determination means for receiving operator saw selection signals;
    lumber conveying means for conveying lumber from a saw determination station to a sawing station;
    memory means including capacitor means which can be selectively charged and discharged;
    saw controller means responsive to energization for activating saw means;
    sequence means operatively connected to said conveying means and moving in direct relation with said lumber's movement on said conveying means from said saw determination station to said sawing station and including write-cam means, and read-cam means, for providing electrical continuity between said saw determination means and said memory means to charge said capacitor means in accordance with said selection signals and for providing electrical continuity between previously charged capacitor means in said memory means and said saw controller means to discharge said capacitors energizing said saw controllers to activate said saws in accordance with previously made selection signals.

12. The saw control apparatus of claim 11 including:
    maximum standard length sensing means operatively connectable through said sequence means to said memory means and responsive to actuation by said lumber to impress an energizing current upon said capacitor means which when connected to said saw controller means will discharge said capacitor means for actuating the saw which corresponds to the maximum standard length sensed by said sensing means;
    said sequence means including length cam means for providing electrical continuity between said length sensing means and said capacitor means when said lumber is actuating all of said sensing means its length warrants.

13. The saw control apparatus of claim 12 wherein: said sequence means includes clear cam means for interrupting electrical continuity in said saw controller means after said lumber has passed through said sawing station to return to said saws to normal position.

14. A control apparatus for selectively activating a plurality of elements at one point in time in accordance with a selection made at an earlier point in time comprising in combination:
    selection determination means which receive element selection signals;
    memory means including capacitor means which can be selectively charged and discharged;
    element control means which activates said elements in response to being energized;

sequence means which at said earlier point in time provides a connection between said determination means and said memory means to charge said capacitor means in accordance with said selection signals and at said one point in time provides a connection between said capacitor means and said element control means to discharge said capacitor means to energize said element control means to activate said elements selected;

said sequence means operates in direct relation to the movement of a workpiece from a station where the element selection is made to a station where the selected elements affect the workpiece so that the time lag between the receipt of said element selection signals and the activation of the elements selected is equal to the time required for said workpiece to traverse from said element selection station to said element activation station.

15. In a multiple-element control apparatus a memory unit comprising in combination:
- multiple banks of first normally open switch means in series with selection means;
- multiple banks of capacitor means in series with said first switch means;
- multiple banks of second normally open switch means in series with said capacitor means;
- memory output means in series with said second switch means;
- first switch closing means for closing said first switch means;
- second switch closing means for closing said second switch means;
- sequence means operatively connectable in any one bank of said switch and capacitor means for closing said first switch means in said one bank to charge said capacitor means in said one bank according to the condition of said selection means at one point in time and for closing said second switch means in said one bank to discharge said capacitor means in said one bank to said output means at a later point in time;
- said sequence means provides a completed circuit from said selection means to one bank of said capacitor means and from another bank of charged capacitor means to said memory output means at the same time.

References Cited by the Examiner

UNITED STATES PATENTS 2,902,092  9/1959  Hildebrandt _____ 234—54 X
3,174,091  3/1965  Ferranto _____ 320—1

WILLIAM W. DYER, JR., *Primary Examiner.*